United States Patent [19]

Poddubny et al.

[11] 4,205,026
[45] May 27, 1980

[54] RADIATION CURABLE POLYBORSILOXANE POLYMER COMPOSITION AND METHOD OF USING SAME TO PRODUCE THERMOSTABLE INSULATING MATERIALS

[76] Inventors: Isaak Y. Poddubny, Bulvar Novatorov 28, kv. 47; Sergei V. Averyanov, prospekt Narodnogo Opolchenia, 181, kv. 18; Lidia A. Averyanova, prospekt Narodnogo, Opolchenia, 181, kv. 18; Mark P. Grinblat, ulitsa Chernyshevskogo, 9, kv. 135, all of Leningrad; Rinat R. Safin, ulitsa Zhdanova, 1, kv. 99, Kazan; Alexandr K. Breger, ulitsa Polyarnaya, 10, kv. 131, Moscow; Vladimir A. Goldin, ulitsa Markhlevskogo, 11, kv. 147, Moscow; Elena Z. Branzburg, ulitsa Uralskaya, 6, korpus 2, kv. 29, Moscow; Viktor S. Kondratovsky, Pogonny proezd, 40, kv. 24, Moscow; Albert G. Kabirov, ulitsa Botanicheskaya, 13, kv. 87, Kazan; Alexandr T. Sanzharovsky, Leninsky prospekt, 99, korpus 3, kv. 186, Moscow; Valeria B. Shtukareva, Tishinskaya ploschad, 6, kv. 85, Moscow; Jury N. Svatikov, Buzheninovskaya ulitsa, 26/6, kv. 41, Moscow; Nadezhda M. Stepanova, ulitsa Gastello, 41, kv. 78, Moscow, all of U.S.S.R.

[21] Appl. No.: 958,789

[22] Filed: Nov. 8, 1978

Related U.S. Application Data

[62] Division of Ser. No. 760,027, Jan. 17, 1977, Pat. No. 4,151,158.

[51] Int. Cl.² .................... B01D 47/00; C08F 2/46; C08F 30/08
[52] U.S. Cl. .................... 264/22; 204/159.13; 260/42.26; 252/63.2; 427/44; 428/447; 428/451; 525/102
[58] Field of Search .................... 204/159.13; 264/22; 260/42.26; 252/63.2; 427/44

[56] References Cited

U.S. PATENT DOCUMENTS

| | | | |
|---|---|---|---|
| 2,569,540 | 10/1951 | Selby | 252/63.2 X |
| 3,255,154 | 6/1966 | Dudley | 260/42.35 X |
| 3,655,565 | 4/1972 | McDonald | 252/63.2 |
| 4,048,356 | 9/1977 | Bakos et al. | 427/379 |
| 4,130,708 | 12/1978 | Friedlander et al. | 528/28 |
| 4,151,148 | 4/1979 | Poddubny et al. | 260/42.26 |

FOREIGN PATENT DOCUMENTS

1282285 7/1972 United Kingdom.

Primary Examiner—Richard B. Turer
Attorney, Agent, or Firm—Lackenbach, Lilling & Siegel

[57] ABSTRACT

According to the invention, the polymer composition comprises 8 to 20 parts by weight of polyborsiloxane having a molecular weight of 2,000 to 5,000 and including structural units $-\!\!\left[BOSi\right]\!\!-$ $-\!\!\left[(CH_3)_2SiO\right]\!\!-$ with a B:Si molar ratio of 1:4 to 5, 40 to 90 parts by weight of polysiloxane rubber, 10 to 60 parts by weight of an organic polymer which may be polyolefins, copolymers of olefins and dienes, halogenated polyolefins, and halogenated copolymers of olefins and dienes, taken separately or in combination with one another, 2 to 10 parts by weight of branched polyorganosiloxane having a molecular weight of 2,000 to 5,000, of the general formula:

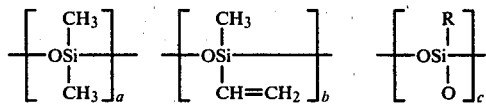

wherein: $R = CH_3$, $C_6H_5$, $a = 43$ to 50 mole %, $b = 0$ to 2 mole %, $c = 50$ to 55 mole %, as well as 10 to 25 parts by weight of silicon dioxide, and 5 to 10 parts by weight of a variable valency metal oxide.

The proposed method of producing thermostable insulating materials from said polymer composition comprises molding said polymer composition on a substrate so as to obtain a blank which is then exposed to ionizing radiation until the absorbed radiation dose reaches 6 to 35 megarads.

Thus, on the basis of the proposed polymer composition there are produced thermostable insulating materials which at room temperature have an adhesion to organic polymers of 3 to 6 kgf/cm² and to metals, 3 to 7 kgf/cm². Such materials are self-adhesive at room temperatures. They also possess satisfactory physico-mechanical and dielectric properties, as well as high thermal, cold and ozone resistance.

The proposed method of producing thermostable insulating materials is quite simple technologically.

5 Claims, No Drawings

RADIATION CURABLE POLYBORSILOXANE POLYMER COMPOSITION AND METHOD OF USING SAME TO PRODUCE THERMOSTABLE INSULATING MATERIALS

This is a division of application Ser. No. 760,027, filed Jan. 17, 1977 and now U.S. Pat. No. 4,151,158.

The present invention relates to polymer compositions and, more particularly, to polymer compositions on the basis of polysiloxane and organic rubbers, as well as to methods of using such compositions to produce thermostable insulating materials.

Such compositions find extensive application in electrical engineering as insulating tapes, rubber-impregnated glass fabrics and varnished fabrics. They are also used as an electrically and thermally insulating material in the production and repair of electric equipment. Finally, such compositions are used to produce insulating and anticorrosion bands to protect gas and oil pipelines.

It is only natural that strength requirements are imposed on polymer compositions of this type, as well as on articles manufactured on their basis. As regards insulating tapes on the basis of such compositions, they are to possess the following properties:

1. The tape's adhesive coating is to ensure adhesion of overlapping layers of the tape which is to be maintained over a period of 15 to 25 years despite the effects of moisture and elevated temperatures.

2. The adhesive layer is to impart certain dielectric properties to the insulating tape which must have an electric strength of no less than 3 kV/mm and a volume resistivity of no less than $10^{10}$ ohm-cm even after the effects of water.

A method of producing thermostable insulating materials on the basis of polymer compositions in question largely determines the properties of articles manufactured on the basis of such compositions, taking into account the fact that normally, the materials and articles on their basis are produced all at the same time.

There are known liquid polymer compositions on the basis of organic polymers, mainly, on the basis of polyisobutylene with a molecular weight of 3,000 to 8,000. Such compositions may also comprise different additives which play the role of fillers and plasticizers. Such compositions feature adhesion of different surfaces, as well as autoadhesion, due to which they are fit for the production of insulating tapes. The tape manufacturing process is as follows: the polymer composition is applied onto a substrate which is, for example, a film of polyethylene or polyvinylchloride. However, such tapes have a low thermal stability (in the order of 80° C.), while their adhesive layer is thermoplastic and unstable. As a result, the sphere of application of such insulating tapes is rather limited.

There are further known polymer compositions based on low-viscosity rubbers, for example, polysiloxane rubbers and boron-containing polymers. Such compositions do not possess adhesion and autoadhesion properties. To impart such properties to a composition, the latter undergoes chemical vulcanization which is carried out as follows. A vulcanizing agent, for example, an organic peroxide, is added to a filler-containing rubber. The composition is then molded on a substrate which corresponds to the type of article to be manufactured. The blank thus produced is then heat-treated over a short period of time at 200° to 350° C. The end product may be, for example, insulating tape. Before use, the substrate is separated from the rubber tape. The latter is applied, layer upon layer, on an article being insulated and warmed up for a long time at 160° to 200° C., which brings about additional vulcanization, and accounts for monolithic autoadhesion of the tape's layers. Insulation tapes thus manufactured feature an increased thermal stability (they can withstand long exposures to temperatures around 180° C.) and are sufficiently elastic and durable. However, such tapes are not adhesive or autoadhesive at room temperature; moreover, their adhesion to polymers is nil at room temperature. Monolithic adhesion of a tape's layers can only be effected after prolonged warming-up of the tape. The latter factor considerably reduces the extent of application of such tapes, which is determined in this case by the size of an article to be insulated and warmed up. Besides, the warming up requires special equipment. Finally, the type of composition under review is disadvantageous in that the manufacture thereof requires the use of peroxides and their attendant explosion hazards.

There is known a composition comprising polyborsiloxane having a molecular weight of 2,000 to 5,000 and including structural units $-[BOSi]-$ $-[(CH_3)_2SiO]-$ with a B:Si ratio of 1:4 to 5, as well as polysiloxane rubber, an organic polymer, low-molecular polyorganosiloxane, silicon dioxide and variable valency metal oxides with the following ratio of the components in terms of parts by weight:

polyborsiloxane, 3 to 8;
polysiloxane rubber, 92 to 97;
organic polymer, 0.5 to 1;
low-molecular polyorganosiloxane, 1 to 5;
silicon dioxide, 30 to 35;
variable valency metal oxide, 10 to 30.

The function of the polysiloxane rubber is performed by dimethylsiloxane polymers comprising $-[(CH_3)_2SiO]-$ units and vinylsiloxane polymers comprising, apart from the above-mentioned units,

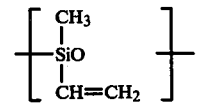

units. The molecular weight of such rubbers is between 150,000 and 900,000.

In such a composition, low-molecular polyorganosiloxane is a polysiloxane rubber having a molecular weight of 5,000 to 40,000 and comprising $-[(CH_3)_2SiO]-$ units. The variable valency metal oxides may be $Fe_2O_3$, $Cr_2O_3$, $TiO_2$ and some others. The organic polymer is used as an additive in order to raise the stiffness of the composition. The organic polymer is added in an amount of 1 part by weight. Normally, it is polytetrafluoroethylene having a molecular weight of 300,000 to 800,000.

The foregoing composition is prepared as follows.

First, polysiloxane rubber and polyborsiloxane (mixture 1) are mixed in a mixer (which may be a roller mixer). Then, silicon dioxide and an organic polymer (mixture 2) are mixed in a ball mill. The next step of the process is carried out in a mixer (roller mixer). During this step, mixture 2 with low-molecular polyorganosiloxane is added, batch after batch, to mixture 1. Finally, a variable valency metal oxide is introduced until a homogeneous mass is obtained.

In the case of the insulating tape manufacture, the composition thus produced is applied by extrusion or calendering onto a substrate, for example, a polyethylene film, in the form of a wet band which is exposed to ionizing radiation (γ-radiation of cobalt-60 or high-speed electrons). Reels of tape are then packed in polyethylene bags and shipped to consumers. Before use, the substrate is peeled off the rubber tape which is wound, layer upon layer, around an article to be insulated. The article is then kept for 6 to 48 hours at room temperature, which ensures monolithic adhesion of the tape's layers due to the high autoadhesive capacity of the tape at room temperatures. Articles made of such compositions have an increased thermal stability (they can withstand long exposures to temperatures of up to 250° C. and short exposures to temperatures of up to 400° C. in the air), as well as high strength (up to 80 kgf/cm²) and elasticity (the elongation amounts to 300 to 800%).

However, the composition under review is disadvantageous in that thermostable insulating materials (tapes and rubber-impregnated glass fabrics) produced on the basis of said composition do not adhere to polyethylene and other polymers at room temperature, whereas their adhesion to metals is not sufficiently high (0.5 kgf/cm²) at room temperature.

It is an object of the present invention to provide a polymer composition which would make it possible to produce thermostable insulating materials featuring sufficiently high adhesion to polyethylene and other polymers at room temperature and high adhesion to metals at this temperature, and having at the same time good physico-mechanical and dielectric properties, as well as high thermal, frost, ozone and water resistance.

It is another object of the invention to provide a method of producing such materials.

The foregoing and other objects of the present invention are attained by providing a polymer composition which comprises polyborsiloxane having a molecular weight of 2,000 to 5,000 and including structural units ⫿BOSi⫿ ⫿(CH₃)₂SiO⫿ with a B:Si molar ratio of 1:4 to 5, polysiloxane rubber, an organic polymer, polyorganosiloxane, silicon dioxide and oxides of variable valency metals. According to the invention, the organic polymer may be polyolefins, copolymers of olefins and dienes, halogenated polyolefins, and halogenated copolymers of olefins and dienes, taken separately or in combination with one another. The polyorganosiloxane is branched polyorganosiloxane having a molecular weight of 2,000 to 5,000 of the general formula:

$$\left[\begin{array}{c}CH_3\\|\\-OSi-\\|\\CH_3\end{array}\right]_a \left[\begin{array}{c}CH_3\\|\\-OSi-\\|\\CH=CH_2\end{array}\right]_b \left[\begin{array}{c}R\\|\\-OSi-\\|\\O\end{array}\right]_c,$$

wherein: R=CH₃, C₆H₅, a=43 to 50 mole %, b=0 to 2 mole %, c=50 to 55 mole %, with the following part-by-weight ratio of the components:
polyborsiloxane, 8 to 20;
polysiloxane rubber, 40 to 90;
organic polymer, 10 to 60;
polyorganosiloxane, 2 to 10;
silicon dioxide, 10 to 25;
variable valency metal oxide, 5 to 10.

The selected type of polyborsiloxane imparts the autoadhesion capacity to the composition of this invention and articles produced on the basis of this composition.

An increase in the amount of polyborsiloxane in the composition above the maximum level reduces the hydrolytic stability of the composition, which makes subsequent treatment of the composition more difficult. A decrease in the amount of polyborsiloxane in the composition below the minimum level results in the fact that the composition and materials manufactured on the basis thereof do not have sufficiently strong autoadhesion.

The function of the polysiloxane rubbers can be performed, for example, by dimethylsiloxane rubber containing ⫿(CH₃)₂SiO⫿ units, vinylsiloxane rubber containing

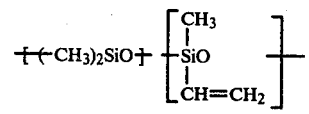

units, methylphenylsiloxane rubber containing

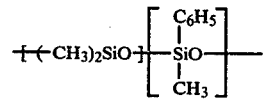

units, and diphenylsiloxane rubber containing ⫿(CH₃)₂SiO⫿ ⫿(C₆H₅)₂SiO⫿ units.

The molecular weight of the selected polysiloxane rubbers is between 300,000 and 900,000. Polysiloxane rubber of this molecular weight imparts strength, thermal stability and dielectric properties to materials manufactured on the basis of the composition in accordance with the present invention. A decrease in the amount of rubber in the composition significantly affects all the above-mentioned properties, while an increase in the rubber content impairs the adhesion and autoadhesion properties.

As stated above, the function of the organic polymer in the proposed composition can be performed by polyolefins, copolymers of olefins and dienes, halogenated polyolefins and halogenated copolymers of olefins and dienes. These components can be used individually or in any combination with one another. The organic polymers account for the composition's adhesive capacity at room temperature with regard to polymers and significantly raise the composition's adhesion to metals within the same temperature range.

The selected branched polyorganosiloxanes are characterized by their high viscosity at room temperature and reduced viscosity at a temperature of 70° to 80° C. For example, the viscosity of polydimethylphenylsiloxane is much higher at room temperature than that of low-molecular polydimethylsiloxane having a molecular weight of 5,000 to 40,000 and containing ⫿(CH₃)₂SiO⫿ units, which is used according to the known method.

As a result, the composition of this invention and materials produced on its basis have a sufficiently high thermal stability; furthermore, the compatibility of all the composition's components is remarkably pronounced. Without affecting the adhesive properties of the composition, branched polyorganosiloxane reduces the composition's viscosity with a reduction in the temperature, whereby subsequent treatment of the composition is greatly facilitated.

The viscosity of branched polyorganosiloxane depends on the type of radical R ($CH_3$ or $C_6H_5$). With R=$C_6H_5$, the viscosity of the polyorganosiloxane is higher than in the case of R=$CH_3$.

If the polyorganosiloxane contains vinyl units (b≠0) it is more liable to further chemical transformations. Thus the type of branched polyorganosiloxane determines the viscosity and reactivity of the composition.

In the composition of this invention, silicon dioxide is a component which improves the mechanical properties of the composition. Pyrogenic types of silicon dioxide can be used, for example, different grades of aerosil with different specific surfaces. Precipitated silicon dioxide can also be used. The optimum content of silicon dioxide in the composition is 10 to 25 parts by weight.

The oxides of variable valency metals can be, for example, $Fe_2O_3$, $Cr_2O_3$ and $TiO_2$.

These oxides play the role of thermal stabilizers and are used in an amount of 5 to 10 parts by weight.

In the proposed polymer composition, the polyolefins can be, for example, polyisobutylene taken in an amount of 20 to 60 parts by weight. In order to facilitate the processing, the molecular weight of polyisobutylene is selected within the range of 5,000 to 50,000. If the molecular weight of polyisobutylene is lower than 5,000, the composition adheres to the equipment employed in the process of its manufacture. A reduction in the polyisobutylene content below the minimum limit impairs the adhesive properties of materials produced on the basis of the composition of this invention. An increase in the polyisobutylene content above 60 parts by weight reduces the durability and thermal stability of insulating materials.

The use of polyethylene, preferably, with a molecular weight of 1,500 to 3,000 as the organic polymer accounts for sufficiently low viscosity levels of polymer compositions. This is of great importance when using polysiloxane rubbers with a molecular weight between 800,000 and 900,000. The optimum polyethylene content is 10 to 15 parts by weight, which accounts for sufficiently high adhesive capacity of the composition, as well as a desired viscosity, and makes the polymer composition sufficiently workable. The above-mentioned molecular weight of polyethylene is selected because of the following considerations. First, it is quite difficult to synthetize polyethylene with a molecular weight below 1,500. On the other hand, polyethylene with a molecular weight of above 3,000 is a solid product which has to be ground to a required fineness in order to be introduced into the composition. It is recommended that the polyolefin be a copolymer of ethylene and propylene, preferably, with a molecular weight of 70,000 to 150,000, taken in an amount of 5 to 20 parts by weight and having a propylene content of 35 to 40 mole %. This copolymer accounts for an increased thermal stability of the composition and, accordingly, of materials produced on its basis. With the above-mentioned propylene content in the copolymer, the latter is a relatively soft type of rubber, which facilitates its introduction into the composition and improves the workability of the composition. It is expedient that this copolymer be used in combination with other organic polymers.

It is advisable that the copolymer of olefin and diene be the copolymer of isobutylene and isoprene, preferably, with a molecular weight of 3,000 to 60,000, taken in an amount of 20 to 60 parts by weight and having an isoprene content of 0.6 to 3 mole %. It can also be the copolymer of ethylene, propylene and ethylidene norbornane, preferably, with a molecular weight of 70,000 to 150,000, taken in an amount of 5 to 20 parts by weight and having a propylene content of 35 to 40 mole % and an ethylidene norbornane content of 1 to 3 mole %.

On the one hand, the foregoing molecular weights and ingredient ratios of the last three types of polymers account for satisfactory workability of the composition. On the other hand, they account for the required properties of the composition, such as adhesion, autoadhesion, thermal stability, etc.

The halogenated polyolefins may be, for example, bromated polyisobutylene taken in an amount of 20 to 60 parts by weight and having a molecular weight of 5,000 to 50,000, bromated copolymer of isobutylene and isoprene taken in an amount of 20 to 60 parts by weight and having an isoprene content of 0.6 to 3 mole % (the molecular weight of the latter copolymer is 3,000 to 60,000). The preferable bromine content for the halogenated polyolefin and halogenated copolymer is 2 to 3 percent by weight. These components make the composition fireproof.

The introduction into the polymer composition of N-bromosuccinimide also makes thermostable insulating materials produced on the basis of this composition fireproof. N-bromosuccinimide is introduced in an amount of 2 to 6 parts by weight. This is an optimum amount at which N-bromosuccinimide is completely bonded with the organic polymer.

According to the invention, the proposed method for producing thermostable insulating materials is characterized by the polymer composition of this invention being molded on a substrate, and the resultant blank being exposed to ionizing radiation to reach an absorbed radiation dose of 6 to 35 megarads.

The substrate may be, for example, a film of polyethylene, polyvinylchloride, or polyimide. It may also be paper impregnated, for example, with wax. Finally, it may be a fabric, such as organosilicon, capron, glass fabric, etc.

The ionizing radiation source may be, for example, radioactive $Co_{60}$, or high-speed electrons.

Organic polymers, such as polyolefins, copolymers of olefins and dienes, and halogenated derivatives of these two types are known to degrade partially or completely after exposure to ionizing radiation. It is also known that polymer compositions on the basis of polysiloxane rubbers and polyborsiloxanes vulcanize under the action of ionizing radiation. It could be expected, therefore, that a composition comprising said components would degrade when exposed to ionizing radiation. In actuality, the proposed polymer composition vulcanizes and makes it possible to manufacture thermostable insulating materials possessing all the required physicomechanical properties. This is due to the fact that an exposure of the proposed composition to ionizing radiation results in the formation of free radicals from organic polymers (which partially degrade) and polysiloxane rubbers which interact with each other, whereby a common vulcanizing network is produced. The latter factor rules out further degradation of the organic polymers.

The co-vulcanization of the borsiloxane and siloxane components accounts for autoadhesion of insulating materials; the organic polymers, which are grafted to siloxane units, account for adhesion of the material to polymers and raise its adhesion to metals.

It is possible to manufacture articles of different configurations from thermostable insulating materials produced on the basis of the proposed composition. The molding conditions are determined by the type of article to be manufactured. In some cases it is advisable that the polymer composition of this invention be molded at a temperature of 60° to 100° C. and a pressure of 20 to 100 atm; this applies, for example, to the molding of plates of different shapes.

The foregoing temperature and pressure ranges are the optimum. Reducing the temperature and pressure below the minimum limit would impair the quality of materials (articles) being produced, whereas raising the temperature and pressure above the maximum level would make the polymer composition less fabricable (the composition adheres to the equipment).

In general, in order to raise the thermal stability of the material, it is desirable that the polymer composition be molded on a substrate which has already been exposed to ionizing radiation so that the absorbed radiation dose amounts from 5 to 50 megarads. This is particularly advisable when the substrate is a film of such polymers (polyethylene, polyvinylchloride) which cross-link when exposed to high-energy radiation. For instance, the thermal stability of non-irradiated polyethylene is 80° C. When irradiated with $\gamma$-rays so that the absorbed radiation dose amount to 25 megarads, the thermal stability of polyethylene reaches 110° C.

The optimum absorbed radiation dose of a blank which is molded on a substrate is 7 to 12 megarads.

At room temperature, thermostable insulating materials produced on the basis of the proposed polymer composition possess an adhesive capacity of about 3 to 6 $kgf/cm^2$ with regard to organic polymers, and 3 to 7 $kgf/cm^2$ with regard to metals; these materials are autoadhesive at room temperatures.

Such materials possess satisfactory physico-mechanical properties, including a sufficiently high thermal stability (130° to 150° C. at prolonged exposures to elevated temperatures, and 250° C. at short exposures), cold resistance ($-50°$ C.), and ozone resistance. These properties remain intact after materials have been stored for 7 to 24 months at 20°C.

Such materials also possess satisfactory dielectric properties: their electric strength is 10 to 25 kV/mm, volume resistivity is $10^{12}$ to $10^{13}$ ohm-cm, and permittivity is 3 to 3.5. These properties are not impaired by moistening.

For example, thermostable insulating tapes produced from such materials have a frost resistance factor of 0.1 to 1.0 at $-50°$ C. As stated above, such tapes have an electric strength of 10 to 25 kV/mm, permittivity of 3 to 3.7, and volume resistivity of $10^{12}$ to $10^{13}$ ohm-cm. Storage during 7 to 24 months does not affect these properties. The adhesive capacity of such tapes is preserved to a large extent (33 percent of the original value) during 1,000 hours after aging at 110° C. Weight losses after aging during 500 hours at 110° C. do not exceed 5 percent.

Due to the use of organic polymers in the proposed composition, polysiloxane rubber, silicon dioxide and oxides of variable valency metals are introduced in lesser quantities than in the case of similar compositions based on polysiloxane rubbers. This accounts for the above-mentioned combination of properties of thermostable insulating materials, which are superior to those of the known polymer compositions.

Insulating materials produced in accordance with the present invention can be used for cable connections and in the production of cable boxes intended for voltages of 1 to 35 kV; such materials are also used for anticorrosion insulation of gas and oil pipelines. For the latter purpose, such materials can be used in combination with conventional insulating materials of similar types.

The basic initial components for the production of the polymer composition of this invention, i.e. polysiloxane and organic polymers, are readily available.

The process of producing thermostable insulating materials according to the invention is quite economical and makes it possible to manufacture articles of different types and configurations.

The proposed method for producing thermostable insulating materials is technologically simple and carried out as follows.

In order to prepare the composition, its components are mixed with the aid of rubber mixers or roller-type mixers at a temperature of 20° to 160° C. Preferably, the sequence of the production steps is like this. First, there is added an organic polymer, for example, polyisobutylene or a copolymer of isobutylene and isoprene or their halogenated derivatives or polyisobutylene with N-bromosuccinimide. Then, to the organic polymer there are successively added polysiloxane rubber, polyborsiloxane, aerosil with a low-molecular polyorganosiloxane, and a variable valency metal oxide.

If the organic polymer used in the process is liquid, for example, if it is low-molecular polyethylene, polysiloxane rubber is added first, whereafter there are added the organic polymer and polyborsiloxane. The remaining components are added as indicated above.

If use is made of a mixture of solid and liquid organic polymers, the components are introduced in the following order: the solid organic polymer, polysiloxane rubber, liquid organic polymer, and polyborsiloxane, the remaining components being added as indicated above.

The result is a rubber mix which is successively passed through a refiner and a strainer in order to eliminate tramps.

The polymer composition thus produced is molded on a substrate, whereby there is produced a blank which is exposed to ionizing radiation to reach an absorbed radiation dose of 6 to 35 megarads, preferably, 7 to 12 megarads. The polymer composition may be molded at a temperature of 60 to 100° C. and a pressure of 20 to 100 atm, for example, in a molding press. The molding conditions are determined by the type of article being manufactured.

In some cases it is preferable that the polymer composition should be molded on a substrate pre-irradiated to an absorbed radiation dose of 5 to 50 megarads.

For example, in order to manufacture insulating tape, the polymer composition is extruded or calendered onto a non-irradiated or irradiated substrate, for example, a film of polyethylene, in the form of a green band. The blank thus produced is exposed to ionizing radiation. The radiation source may be, for example, $\gamma$-radiation of $Co_{60}$, or high-speed electrons.

Rolls of finished tape are packed in polyethylene bags and shipped to consumers. Before use, the substrate is peeled off, so that only the rubber tape is used as insulation; the tape can also be used with the substrate. In both cases the insulating tape is wound around an article to be insulated which is kept for 6 to 48 hours at room temperature. As a result, the tape layers effectively adhere to each other; the tape itself adheres to the article due to its high adhesion and autoadhesion capacity at room temperatures.

The objects and advantages of the present invention will be more readily understood from the following examples of preferred embodiments thereof.

EXAMPLE 1

45 parts of weight of methylvinylsiloxane rubber having a molecular weight of 500,000 and a methylvinylsiloxane unit content of 0.07 mole %, 5 parts by weight of copolymer of ethylene and propylene with a propylene unit content of 35 mole %, 50 parts by weight of polyisobutylene with a molecular weight of 19,000, 12 parts by weight of polyborsiloxane with a B:Si molar ratio of 1:5 and a molecular weight of 2,000, 5 parts by weight of polydimethylphenylsiloxane with a molecular weight of 2,000, 15 parts by weight of aerosil, and 5 parts by weight of $Fe_2O_3$ are mixed in a roller mixer at a temperature of 50° to 60° C. The rubber mix thus obtained is passed through a laboratory refiner with a clearance between the rollers of less than 0.08 mm (this is done at the same temperature) and then through a strainer in order to separate tramps. The resultant polymer composition is listed in Table 1.

EXAMPLE 2

A polymer composition is prepared as in Example 1, but instead of the copolymer of ethylene and propylene the composition includes 5 parts by weight of the copolymer of ethylene, propylene and ethylidene norbornane having a molecular weight of 80,000, a propylene content of 35 mole % and an ethylidene norbornane content of 1.1 mole %. The resultant composition is listed in Table 1.

EXAMPLE 3

A polymer composition is prepared as in Example 1. The composition comprises 45 parts by weight of dimethylsiloxane rubber with a molecular weight of 400,000, 5 parts by weight of the copolymer of ethylene and propylene containing 35 mole percent of propylene units, 50 parts by weight of polyisobutylene with a molecular weight of 19,000, 10 parts by weight of polyborsiloxane with a B:Si molar ratio of 1:4 and a molecular weight of 5,000, 5 parts by weight of polydimethylphenylsiloxane having a molecular weight of 5,000, 15 parts by weight of aerosil, and 5 parts by weight of $Fe_2O_3$. The resultant composition is listed in Table 1.

EXAMPLE 4

A polymer composition is prepared as in Example 1. The composition comprises 43 parts by weight of dimethylsiloxane rubber having a molecular weight of 400,000, 7 parts by weight of the copolymer of ethylene and propylene having a molecular weight of 150,000 and a propylene unit content of 35 mole %, 50 parts by weight of polyisobutylene having a molecular weight of 19,000, 10 parts by weight of polyborsiloxane with a B:Si molar ratio of 1:4 and a molecular weight of 5,000, 5 parts by weight of polydimethylphenylsiloxane having a molecular weight of 5,000, 15 parts by weight of aerosil, and 5 parts by weight of $Fe_2O_3$. The resultant composition is listed in Table 1.

EXAMPLE 5

A polymer composition is prepared as in Example 3, but it contains 40 parts by weight of dimethylsiloxane rubber having a molecular weight of 450,000 and 10 parts by weight of the copolymer of ethylene and propylene of Example 4. The resultant composition is listed in Table 1.

EXAMPLE 6

A polymer composition is prepared as in Example 5, but it contains 12 parts by weight of polyborsiloxane of Example 4. The resultant composition is listed in Table 1.

EXAMPLE 7

A polymer composition is prepared as in Example 1. The composition comprises 30 parts by weight of methylvinylsiloxane rubber having a molecular weight of 900,000 and a methylvinylsiloxane unit content of 0.07 mole %, 20 parts by weight of the copolymer of ethylene and propylene having a molecular weight of 70,000 and a propylene content of 35 mole %, 50 parts by weight of polyisobutylene having a molecular weight of 50,000, 8 parts by weight of polyborsiloxane with a B:Si molar ratio of 1:4 and a molecular weight of 5,000, 5 parts by weight of polydimethylmethylsiloxane having a molecular weight of 5,000, 12 parts by weight of aerosil, and 10 parts by weight of $Fe_2O_3$. The resultant composition is listed in Table 1.

EXAMPLE 8

40 parts by weight of dimethylsiloxane rubber having a molecular weight of 400,000, 10 parts by weight of the copolymer of ethylene, propylene and ethylidene norbornane having a molecular weight of 70,000 and a propylene content of 40 mole % and an ethylidene norbornane content of 3 mole %, 50 parts by weight of polyisobutylene having a molecular weight of 19,000, 9 parts by weight of polyborsiloxane having a B:Si molar ratio of 1:4 and a molecular weight of 5,000, 3 parts by weight of polydimethylmethylvinylphenylsiloxane having a molecular weight of 3,000, a methylvinylsiloxane unit content of 2 mole % and a phenylsiloxane unit content of 43 mole %, 12 parts by weight of aerosil, and 5 parts by weight of $Fe_2O_3$ are mixed in a closed Banbury mixer during 45 minutes at a temperature of 85° to 160° C. The rubber mix is treated as in Example 1. The resultant polymer composition is listed in Table 1.

EXAMPLES 9 through 38

Polymer compositions are prepared as in Example 1. The compositions are listed in Table 1.

According to Examples 9 through 19, 22, 23 and 31, use is made of the components of Example 1.

According to Example 20, use is made of a mixture of solid polyisobutylene with a molecular weight of 19,000 and liquid polyisobutylene having a molecular weight of 8,000, the weight ratio between the two being 4:1, respectively.

According to Example 21, use is made of polyisobutylene with a molecular weight of 8,000.

According to Example 24, use is made of methylvinylsiloxane rubber having a molecular weight of 500,000 and a methylvinylsiloxane unit content of 1 mole %.

According to Example 27, use is made of bromated polyisobutylene with a molecular weight of 25,000 and a bromine content of 3 percent by weight.

According to Example 33, use is made of the copolymer of isobutylene and isoprene having a molecular weight of 3,000 and an isoprene content of 0.6 mole %.

According to Example 34, use is made of the copolymer of Example 33, having a molecular weight of 60,000 and an isoprene content of 3 mole %.

According to Example 35, use is made of polyisobutylene having a molecular weight of 19,000, and liquid polyethylene having a molecular weight of 1,500.

According to Example 36, use is made of liquid polyethylene with a molecular weight of 3,000.

According to Example 37, use is made of the bromated copolymer of isobutylene and isoprene having a molecular weight of 60,000, an isoprene content of 0.6 mole % and a bromine content of 2 percent by weight.

According to Example 38, use is made of the bromated copolymer of isobutylene and isoprene with a molecular weight of 3,000, an isoprene content of 3 mole % and a bromine content of 3 percent by weight.

EXAMPLE 39

The polymer composition of Example 1 is molded in the form of a cord of a round section with a diameter of 25 mm. This is done by passing the composition through an extruder. The cord is then passed through a profiling calender provided with a winding-up means. At the same time into the bite of the calender there is fed polyethylene film having a thickness of 60 mu. As a result, there is produced a blank in the form of a band which comprises the polymer composition molded on a substrate (the latter being the polyethylene film). The blank is 0.6 to 0.9 mm thick. The blank is wound up into rolls having a diameter of 10 to 12 cm and a width of 8 to 9 cm, and is vulcanized through an exposure to $\gamma$-radiation of $Co_{60}$. The absorbed dose is 7 megarads. The results of testing the thermostable insulating tape thus produced are listed in Table 2.

EXAMPLE 40

The polymer composition of Example 2 is molded as in Example 39 on a film of black-containing polyethylene (the black content amounts to 0.5 percent by weight). The film is 0.2 mm thick. The results of testing the tape are tabulated in Table 2.

EXAMPLE 41

The polymer composition of Example 3 is molded as in Example 39 in the form of a cord with a diameter of 7 mm, wherefrom there is produced a tape which is 25 mm wide. The blank is vulcanized till an absorbed radiation dose amounts to 8 megarads. The results of testing the tape are listed in Tables 2 and 3.

EXAMPLES 42 THROUGH 68

The polymer compositions of Examples 4 through 30 are molded as in Example 39. According to all these examples, there is molded a cord with a diameter of 14 mm. The width of the insulating tape is 50 mm.

According to Example 43, the substrate is a preirradiated polyethylene film (the absorbed radiation dose is 5 megarads).

According to Example 45, the substrate is polyvinylchloride film containing $TiO_2$. The film has a thickness of 0.15 mm.

According to Examples 46, 48, 58, 62 and 66, the substrate is polyvinylchloride film with a thickness of 0.1 mm.

According to Example 47, 59, 64, 65 and 68, the substrate is varnished silicone fabric having a thickness of 0.15 mm; according to Example 61, the substrate is capron fabric with a thickness of 0.1 mm.

The absorbed radiation doses and the results of testing these tapes (without the substrates) are listed in Table 2. Additional information with regard to Examples 42, 46, 50, 51, 56, 57, 62 and 65 is contained in Table 3.

The insulating tape of Example 43 can be used with the substrate. In this case the tape's strength amounts to 33 $kgf/cm^2$.

EXAMPLE 69

The polymer composition of Example 31 is placed in a press mold having inner dimensions of $120 \times 120 \times 1$ mm, whose bottom and cover are lined with tracing paper. The composition is then press-molded at a pressure of 100 atm and a temperature of 80° C. during 15 minutes.

The blank thus obtained is exposed to ionizing radiation. The absorbed radiation dose and the results of testing are listed in Table 2.

EXAMPLES 70 THROUGH 74

The polymer composition of Examples 32 through 36 is molded as in Example 39.

According to Examples 70 and 73, the substrate is varnished silicone fabric having a thickness of 0.15 mm.

According to Example 71, the substrate is polyvinylchloride film with a thickness of 0.1 mm. The molded blank is covered with polyethylene film and exposed to ionizing radiation.

According to Examples 72 and 74, the substrate is polyethylene film having a thickness of 60 mu.

The absorbed radiation doses and the results of testing the tapes thus produced (without the substrates) are listed in Table 2. Additional data with regard to testing the tape of Example 74 are listed in Table 3.

The testing data with regard to Example 71 are related to an insulating tape with a substrate of polyvinylchloride.

EXAMPLES 75 AND 76

The polymer compositions of Examples 37 and 38 are molded as in Example 69 at a temperature of 100° C. and a pressure of 20 atm.

The substrate is of tracing paper. The absorbed radiation doses and testing results are listed in Table 3.

Table 1

COMPONENTS OF POLYMER COMPOSITION, PARTS BY WEIGHT

| | Organic Copolymers | | | | | | | | Polysiloxane rubber | | | Branched polyorganosiloxane | | | | | | | |
|---|---|---|---|---|---|---|---|---|---|---|---|---|---|---|---|---|---|---|---|
| Serial No. | Polyiso-butylene | Co-polymer of isoby-tylene and isoprene | Poly-ethy-lene | Bro-mated poly-iso-buty-lene | Bro-mated copoly-mer of isobuty-lene and iso-prene | Co-polymer of ethy-lene and propy-lene | Copoly-mer of ethylene, propy-lene, ethy-lidene nor-bornane | N-bromo-suc-cini-mide | Di-methyl-silox-ane rub-ber | Methyl-vinyl-silox-ane rub-ber | Polybor-silox-ane | Polydi-methyl-phenyl-siloxane | Polydi-methyl-methyl-siloxane | Polydi-methyl-vinyl-phenyl-siloxane | Aerosil | Precipi-tated SiO$_2$ | Fe$_2$O$_3$ | TiO$_2$ | Cr$_2$O |
| 1 | 2 | 3 | 4 | 5 | 6 | 7 | 8 | 9 | 10 | 11 | 12 | 13 | 14 | 15 | 16 | 17 | 18 | 19 | 20 |
| 1 | 50 | — | — | — | — | 5 | — | — | — | 45 | 12 | 5 | — | — | 15 | — | 5 | — | — |
| 2 | 50 | — | — | — | — | — | 5 | — | — | 45 | 12 | 5 | — | — | 15 | — | 5 | — | — |
| 3 | 50 | — | — | — | — | 5 | — | — | 45 | — | 10 | 5 | — | — | 15 | — | 5 | — | — |
| 4 | 50 | — | — | — | — | 7 | — | — | 43 | — | 10 | 5 | — | — | 15 | — | 5 | — | — |
| 5 | 50 | — | — | — | — | 10 | — | — | 40 | — | 10 | 5 | — | — | 15 | — | 5 | — | — |
| 6 | 50 | — | — | — | — | 10 | — | — | 40 | — | 12 | — | — | — | 12 | — | 5 | — | — |
| 7 | 50 | — | — | — | — | 20 | — | — | — | 30 | — | 5 | — | 3 | 12 | — | 10 | — | — |
| 8 | 50 | — | — | — | — | — | 10 | — | 40 | — | 7 | — | 5 | — | 15 | — | 5 | — | — |
| 9 | 50 | — | — | — | — | 15 | — | — | — | 35 | 14 | 2 | — | — | 12 | — | 10 | — | — |
| 10 | 50 | — | — | — | — | 20 | — | — | — | 30 | 12 | 5 | — | — | 15 | — | 10 | — | — |
| 11 | 40 | — | — | — | — | 10 | — | — | — | 50 | 12 | 5 | — | — | 15 | — | 10 | — | — |
| 12 | 40 | — | — | — | — | 10 | — | — | — | 50 | 9 | 5 | — | — | 15 | — | 10 | — | — |
| 13 | 40 | — | — | — | — | 10 | — | — | — | 50 | 9 | 5 | — | — | 15 | — | 10 | 3 | — |
| 14 | 40 | — | — | — | — | 10 | — | — | — | 50 | 10 | 5 | — | — | 15 | — | 5 | — | — |
| 15 | 40 | — | — | — | — | 20 | — | — | — | 50 | 10 | 5 | — | — | 15 | — | 10 | — | — |
| 16 | 40 | — | — | — | — | — | — | — | — | 50 | 12 | 5 | — | — | 15 | — | 10 | — | — |
| 17 | 50 | — | — | — | — | — | — | — | — | 50 | 12 | 5 | — | — | 15 | — | 5 | — | — |
| 18 | 50 | — | — | — | — | — | — | — | — | 50 | 10 | 10 | — | — | 15 | — | 10 | — | — |
| 19 | 50 | — | — | — | — | — | — | — | — | 50 | 10 | 5 | — | — | 15 | — | 10 | — | — |
| 20 | 50 | — | — | — | — | — | — | — | — | 50 | 10 | 5 | — | — | 15 | — | 10 | — | — |
| 21 | 50 | — | — | — | — | — | — | — | — | 50 | 9 | 5 | — | — | 15 | — | 5 | — | — |
| 22 | 50 | — | — | — | — | — | — | — | — | 50 | 8 | 5 | — | — | 15 | — | 5 | 3 | — |
| 23 | 50 | — | — | — | — | — | — | 6 | — | 50 | 8 | 5 | — | — | 15 | — | 5 | — | — |
| 24 | 50 | — | — | — | — | — | — | 2 | — | 50 | 8 | 5 | — | — | 18 | 15 | 5 | — | — |
| 25 | 50 | — | — | — | — | — | — | — | — | 50 | 8 | — | — | — | 18 | 7,5 | 5 | — | — |
| 26 | 50 | — | — | 50 | — | — | — | — | — | — | — | — | — | — | — | — | — | — | — |
| 27 | 60 | — | — | — | — | — | — | — | — | 40 | 8 | 5 | — | — | 5 | — | 5 | — | — |
| 28 | 60 | — | 10 | — | — | — | — | — | — | 40 | 8 | 5 | — | — | 18 | — | 10 | — | — |
| 29 | 60 | — | 15 | — | — | — | — | — | — | 40 | 8 | 2 | — | — | 18 | — | 10 | — | — |
| 30 | 45 | — | 10 | — | — | — | — | — | — | 50 | 20 | 1 | — | — | 10 | — | 10 | — | — |
| 31 | 40 | — | 10 | — | — | — | — | — | — | 50 | 20 | 2 | — | — | 10 | — | 10 | — | — |
| 32 | 40 | — | 10 | — | — | — | — | — | — | 50 | 8 | 3 | — | — | 10 | — | 5 | — | — |
| 33 | — | — | 10 | — | — | — | — | — | — | 60 | 8 | 3 | — | — | 10 | — | 10 | — | — |
| 34 | — | 40 | 10 | — | — | — | — | — | — | 80 | 8 | 3 | — | — | 15 | 20 | 10 | — | — |
| 35 | 20 | — | — | — | — | — | — | — | — | 90 | 20 | 5 | — | — | — | — | 5 | — | — |
| 36 | — | — | — | — | 50 | — | — | — | — | 50 | 20 | 2 | — | — | 25 | — | 10 | — | — |
| 37 | — | — | — | — | 40 | — | — | — | — | 50 | 8 | 1 | — | — | 10 | — | 10 | — | — |
| 38 | — | — | 10 | — | — | — | — | — | — | 50 | 8 | — | — | — | 10 | — | — | — | 5 |

Table 2

| Serial No | Radiation dose, megarads | Physico-Mechanical Characteristics | | | | | | Adhesion, kgf/cm² | | Equilibrium Swelling, wt. % | |
|---|---|---|---|---|---|---|---|---|---|---|---|
| | | Initial at 20° C. | | | After Aging during 48 hours at 150° C. | | | to poly-ethylene | to steel | gasoline | water |
| | | P | L | l | P | L | l | | | | |
| 1 | 2 | 3 | 4 | 5 | 6 | 7 | 8 | 9 | 10 | 11 | 12 |
| 39 | 7 | 11 | 850 | 44 | 28 | 405 | 53 | 4.1 | 7.1 | 249 | 1.6 |
| 40 | 7 | 14 | 845 | 64 | 20 | 360 | 28 | 3.8 | 5.9 | 244 | 2.2 |
| 41 | 8 | 12 | 980 | 64 | 14 | 520 | 76 | 5.7 | 6.9 | 291 | 1.3 |
| 42 | 8 | 15 | 970 | 58 | 14 | 470 | 68 | 4.0 | 5.0 | 327 | 2.2 |
| 43 | 8 | 14 | 1030 | 76 | 14 | 455 | 48 | 4.6 | 6.0 | 230 | 1.1 |
| 44 | 7.5 | 7 | 1170 | 84 | 14 | 350 | 60 | 5.7 | 7.0 | | |
| 45 | 8 | 6 | 1020 | 220 | 8 | 275 | 15 | 5.1 | 6.0 | | |
| 46 | 8.9 | 10 | 960 | 66 | 8 | 670 | 70 | 4.4 | 5.5 | | |
| 47 | 7 | 12 | 1160 | 108 | 9 | 450 | 66 | | | | |
| 48 | 7 | 5 | 1070 | 96 | 4 | 500 | 32 | 4.5 | 5.8 | | |
| 49 | 7 | 19 | 930 | 57 | 15 | 740 | 16 | 4.8 | 6.8 | | |
| 50 | 7.2 | 17 | 840 | 52 | 14 | 600 | 52 | 3.6 | 5.4 | | 1.3 |
| 51 | 7.2 | 15 | 780 | 47 | 11 | 580 | 70 | 3.6 | 5.0 | | 2.6 |
| 52 | 8.3 | 12 | 1100 | 52 | 13 | 720 | 56 | 4.1 | 5.4 | | |
| 53 | 8.3 | 14 | 810 | 56 | 12 | 680 | 27 | 4.2 | 5.5 | | |
| 54 | 8 | 19 | 825 | 26 | 15 | 570 | 44 | 4.7 | 5.9 | | |
| 55 | 8 | 16 | 780 | 46 | 24 | 500 | 12 | 5.2 | 5.9 | | |
| 56 | 8.3 | 16 | 1000 | 62 | 17 | 575 | 40 | 4.2 | 6.2 | 294 | 2.6 |
| 57 | 8 | 16 | 845 | 51 | 20 | 575 | 55 | 3.8 | 5.6 | | |
| 58 | 7 | 13 | 940 | 46 | 20 | 285 | 11 | 4.2 | | | |
| 59 | 10.1 | 10 | 1240 | 60 | 23 | 690 | 40 | 4.6 | | | |
| 60 | 7.2 | 17 | 790 | 40 | 15 | 3,390 | 48 | 4.0 | 6.2 | | 2.2 |
| 61 | 8 | 15 | 750 | 30 | 22 | 260 | 14 | 3.4 | 5.1 | | 2.4 |
| 62 | 9.8 | 16 | 755 | 28 | | | | 4.0 | 5.1 | | |
| 63 | 7.3 | 11 | 1560 | 64 | | | | 3.9 | 5.2 | | |
| 64 | 8 | 7 | 760 | 24 | 22 | 565 | 28 | 4.0 | | | |
| 65 | 7.4 | 13 | 945 | 32 | 20 | 355 | 18 | 3.6 | | | |
| 66 | 3.5 | 6 | 680 | 68 | 6 | 210 | 66 | 5.5 | 6.1 | | |
| 67 | 8.5 | 7 | 1230 | 96 | 5 | 350 | 100 | 3.8 | 5.2 | | |
| 68 | 10.2 | 15 | 1120 | 40 | | | | 3.5 | | | |
| 69 | 11.2 | 9 | 690 | 12 | | | | 2.4 | | | |
| 70 | 12 | 8 | 855 | 12 | | | | 3.1 | | | |
| 71 | 7 | 50 | 200 | 5 | | | | 3.6 | | | |
| 72 | 9 | 9 | 1560 | 106 | 5 | 630 | 60 | 2.7 | 3.7 | | |
| 73 | 11.7 | 11 | 355 | 4 | 14 | 310 | 13 | 1.5 | | | |
| 74 | 9 | 33 | 505 | 29 | 27 | 330 | 14 | 0.9 | | 378 | |
| 75 | 12.5 | 17 | 730 | 17 | | | | 2.3 | | | |
| 76 | 12.5 | 10 | 530 | 8 | | | | 3.1 | | 204 | |

P is tensile strength, kgf/cm²
L is yield strength, %
l is permanent elongation, %

Table 3

| Serial No | Physical-Mechanical Characteristics After Aging | | | | | | | | | | | | | | | Adhesion, kgf/cm² | |
|---|---|---|---|---|---|---|---|---|---|---|---|---|---|---|---|---|---|
| | 120° C. 120 days | | | 150° C. 15-20 days | | | 180° C. 2 days | | | 200° C. 1 day | | | 250° C. 1 hour | | | to copper | to aluminum |
| | P | L | l | P | L | l | P | L | l | P | L | l | P | L | l | | |
| 41 | | | | 19 | 185 | 36 | | | | 29 | 95 | 18 | | | | 7.0 | 7.2 |
| 42 | | | | 20 | 130 | 26 | 38 | 95 | 12 | 23 | 75 | 12 | 28 | 75 | 10 | | |
| 46 | | | | 14 | 235 | 32 | 23 | 220 | 30 | 12 | 330 | 82 | 6 | 245 | 47 | 6.6 | 7.0 |
| 47 | | | | 25 | 250 | 24 | 27 | 220 | 32 | 38 | 145 | 20 | 8 | 105 | 19 | | |
| 48 | | | | 13 | 65 | 13 | | | | | | | 5 | 260 | 88 | | |
| 50 | 25 | 150 | 6 | 27 | 235 | 20 | | | | 27 | 140 | 22 | 6 | 70 | 38 | | |
| 51 | 24 | 145 | 6 | 32 | 190 | 8 | 15 | 310 | 44 | 21 | 225 | 70 | 5 | 460 | 66 | 6.5 | 6.7 |
| 56 | | | | | | | | | | | | | 4 | 210 | 52 | 6.3 | |
| 57 | | | | | | | | | | 16 | 110 | 14 | 5 | 70 | 18 | | |
| 62 | | | | 40 | 50 | 2 | | | | 13 | 120 | 22 | | | | | |
| 65 | 25 | 110 | 7 | 35 | 90 | 4 | | | | 16 | 165 | 6 | | | | | |
| 74 | | | | | | | | | | 27 | 240 | 4 | | | | | |

P, L and l are as in Table 2.

What is claimed is:

1. A method for producing thermostable insulating materials, whereby a polymer composition, comprising 8 to 20 parts by weight of polyborsiloxane having a molecular weight of 2,000 to 5,000 and containing structural units. BOSi $+(CH_3)_2SiO+$ with a B:Si molar ratio of 1:4 to 5, 40 to 90 parts by weight of polysiloxane rubber, 10 to 60 parts by weight of an organic polymer selected from the group consisting of polyolefins, copolymers of olefins and dienes, halogenated polyolefins and halogenated copolymers of olefins and dienes, 2 to 10 parts by weight of branched polyorganosiloxane having a molecular weight of 2,000 to 5,000, of the general formula:

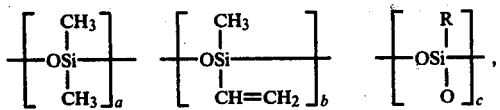

R is a radical selected from a group of radicals composed of $CH_3$ and $C_6H_5$, a=43 to 50 mole %, b=0 to 2 mole %, c=50 to 55 mole %, 10 to 25 parts by weight of silicon dioxide, and 5 to 10 parts by weight of a variable valency metal oxide, is molded on a substrate to produce a blank which is exposed to ionizing radiation to reach an absorbed radiation dose of 6 to 35 megarads.

2. A method as claimed in claim 1, whereby said polymer composition is molded at a temperature of 60° to 100° C. and a pressure of 20 to 100 atm.

3. A method as claimed in claim 1, whereby said polymer composition is molded on a substrate preexposed to ionizing radiation to reach an absorbed radiation dose of 5 to 50 megarads.

4. A method as claimed in claim 2, whereby said polymer composition is molded on a substrate preexposed to ionizing radiation to reach an absorbed radiation dose of 5 to 50 megarads.

5. A method as claimed in claim 1, whereby the blank is exposed to ionizing radiation to reach an absorbed radiation dose of 7 to 12 megarads.

* * * * *